[19] United States Patent
Mukherjee

(10) Patent No.: US 9,350,172 B2
(45) Date of Patent: *May 24, 2016

(54) PREDICTIVE PHASE BALANCING FOR DEMAND RESPONSE

(75) Inventor: Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 781 days.

This patent is subject to a terminal disclaimer.

(21) Appl. No.: 13/561,772

(22) Filed: Jul. 30, 2012

(65) Prior Publication Data

US 2014/0031998 A1 Jan. 30, 2014

Related U.S. Application Data

(63) Continuation of application No. 13/556,781, filed on Jul. 24, 2012.

(51) Int. Cl.
*H02J 3/00* (2006.01)
*H02J 3/26* (2006.01)
*H02J 3/28* (2006.01)

(52) U.S. Cl.
CPC ... *H02J 3/26* (2013.01); *H02J 3/28* (2013.01); *H02J 2003/003* (2013.01)

(58) Field of Classification Search
None
See application file for complete search history.

(56) References Cited

U.S. PATENT DOCUMENTS

| 5,604,385 | A | | 2/1997 | David |
| 6,018,203 | A | * | 1/2000 | David et al. ............... 307/52 |
| 6,628,009 | B1 | * | 9/2003 | Chapel .................... 307/14 |
| 7,242,110 | B2 | * | 7/2007 | Matsumoto et al. ........ 307/14 |
| 7,732,940 | B2 | * | 6/2010 | Kim et al. ................. 307/14 |
| 7,898,104 | B1 | * | 3/2011 | Verges ..................... 307/14 |
| 8,054,598 | B1 | * | 11/2011 | Sadler et al. .............. 361/63 |
| 8,392,031 | B2 | * | 3/2013 | Krok et al. ............... 700/291 |
| 2003/0083788 | A1 | * | 5/2003 | Harada et al. ............ 700/291 |
| 2004/0236620 | A1 | | 11/2004 | Chauhan et al. |
| 2007/0203860 | A1 | * | 8/2007 | Golden et al. ............ 705/412 |
| 2009/0048718 | A1 | * | 2/2009 | Richard et al. ........... 700/296 |
| 2009/0189456 | A1 | * | 7/2009 | Skutt ...................... 307/87 |
| 2009/0309570 | A1 | * | 12/2009 | Lehmann et al. ......... 323/318 |

(Continued)

FOREIGN PATENT DOCUMENTS

| CN | 101976841 A | 2/2011 |
| CN | 201853335 U | 6/2011 |
| JP | 2004080883 A | 3/2004 |

OTHER PUBLICATIONS

Robert McFarlane, How to balance three-phase power to maximize UPS capacity, TechTarget, May 2012.*

(Continued)

*Primary Examiner* — Christopher E Everett
(74) *Attorney, Agent, or Firm* — Cantor Colburn LLP

(57) ABSTRACT

Predictive phase balancing is implemented by receiving customer demand profiles from each customer serviced by a poly-phase grid network and creating a demand forecast from anticipated power demands collected from the customer demand profiles. Creating the customer demand profiles includes breaking down loads for each customer by corresponding phases in the poly-phase power grid network. The loads correspond to the anticipated power demands. The predictive phase balancing is further implemented by balancing the loads among each of the phases based on any load imbalances determined from the demand forecast.

16 Claims, 3 Drawing Sheets

(56) References Cited

U.S. PATENT DOCUMENTS

| | | | |
|---|---|---|---|
| 2011/0060474 A1 | 3/2011 | Schmiegel et al. | |
| 2011/0172838 A1 | 7/2011 | Pai et al. | |
| 2011/0196546 A1 | 8/2011 | Muller et al. | |
| 2012/0175951 A1* | 7/2012 | Pamulaparthy et al. | 307/11 |
| 2012/0253710 A1* | 10/2012 | Lehmann et al. | 702/61 |
| 2012/0316691 A1* | 12/2012 | Boardman et al. | 700/293 |

OTHER PUBLICATIONS

Chia-Hung Lin; Chao-Shun Chen; Hui-Jen Chuang; Cheng-Yu Ho, "Heuristic rule-based phase balancing of distribution systems by considering customer load patterns," Power Systems, IEEE Transactions on , vol. 20, No. 2, pp. 709-716, May 2005.*

Rick Brakken et al, "Integrating Customer Load and GIS Data for Improved Distribution Planning & Operations," IEEE, pp. 1-7, (2006).

ElectroFlow Solutions, [online], [retrieved on Jun. 4, 2012]; retrieved from the Internet http://www.electroflowsolutions.com/3-phase-balancing.html Electroflow Solutions, "3 Phase Balancing," 1 page (2012).

Robert T. Emmet, et al, "AC Magnetic Phase Balancing—A Method of Power Quality Control," 2003, pp. 1-9.

Chia-Hung Lin, et al., "Phase Balancing of Distribution Systems Using a Heuristic Search Approach," 2012, pp. 1-6.

Jinxiang Zhu, et al., "Phase Balancing Using Mixed-Integer Programming," IEEE Transactions on Power Systems, vol. 13, No. 4; pp. 1-6, Nov. 1998.

Jinxiang Zhu, et al., "Phase Balancing Using Simulated Annealing," IEEE Transactions on Power Systems, vol. 14, No. 4, pp. 1-6, Nov. 1999.

U.S. Appl. No. 13/556,781; Non-Final Office Action; Date Filed: Jul. 24, 2012; Date Mailed: Mar. 5, 2015; 40 pages.

* cited by examiner

| PHASES | 12-1 | 1-2 | 2-3 | 3-4 | 4-5 |
|---|---|---|---|---|---|
| PHASE 1 (LOAD IN WATTAGE) | 500+<br>400+<br>300=<br>1200 | 600+<br>400+<br>300=<br>1300 | 600+<br>400+<br>300=<br>1300 | 1600+<br>400+<br>300=<br>2300 | 1600+<br>400+<br>300=<br>2300 |
| PHASE 2 (LOAD IN WATTAGE) | 100+<br>100+<br>200+<br>900=<br>1300 | 200+<br>100+<br>200+<br>900=<br>1400 | 200+<br>100+<br>200+<br>900=<br>1400 | 200+<br>100+<br>200+<br>900=<br>1400 | 200+<br>100+<br>200+<br>900=<br>1400 |
| PHASE 3 (LOAD IN WATTAGE) | 700+<br>300+<br>100=<br>1100 | 700+<br>300+<br>100=<br>1100 | 700+<br>300+<br>300=<br>1300 | 700+<br>300+<br>300=<br>1300 | 700+<br>100+<br>100=<br>900 |
| MAX DIFFERENCE | 200 | 300 | 100 | 1000 | 1400 |

PREDICTIVE PHASE BALANCING FOR DEMAND RESPONSE

CROSS-REFERENCE TO RELATED APPLICATION

This application is a continuation of U.S. patent application Ser. No. 13/556,781, filed Jul. 24, 2012, the disclosure of which is incorporated by reference herein in its entirety.

BACKGROUND

The present invention relates to energy distribution, and more specifically, to predictive phase balancing for demand response.

As industrialized societies continue to grow in an ever-changing global economy, more and more demands are placed on natural resources (e.g., water, petroleum, minerals, air). Over-consumption of these limited resources, as well as the effects this consumption has on the environment, has understandably become an increasing concern among various individuals, businesses, and organizations which, as a result, are seeking to discover new ways to better manage and preserve them.

One example of a constrained resource is electricity. In the United States, electrical power may be produced from natural resources by a coalition of providers via power plants and then distributed over one or more grids. Alternatively, power may be produced and distributed without a grid via, e.g., independent wind farms or solar cells. As electric power cannot easily be stored, in order to meet demand, power suppliers attempt to estimate the amount of power required for current, future and near future operations; however, these estimations do not account for unforeseen events and are not very accurate.

SUMMARY

In an embodiment, a method for predictive phase balancing is provided. The method includes receiving customer demand profiles from each customer serviced by a poly-phase grid network and creating a demand forecast from anticipated power demands collected from the customer demand profiles. The creating includes breaking down loads for each customer by corresponding phases in the poly-phase power grid network. The loads correspond to the anticipated power demands. The method also includes balancing the loads among each of the phases based on any load imbalances determined from the demand forecast.

In accordance with another embodiment, a computer program product for implementing predictive phase balancing is provided. The computer program product includes a storage medium having computer instructions embodied thereon, which when executed by a computer, causes the computer to implement a method. The method includes receiving customer demand profiles from each customer serviced by a poly-phase grid network and creating a demand forecast from anticipated power demands collected from the customer demand profiles. The creating includes breaking down loads for each customer by corresponding phases in the poly-phase power grid network. The loads correspond to the anticipated power demands. The method also includes balancing the loads among each of the phases based on any load imbalances determined from the demand forecast.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

FIG. 3 is a table depicting a sample demand forecast in an exemplary embodiment.

DETAILED DESCRIPTION

In exemplary embodiments, the management of electrical power generation and distribution in a poly-phase power grid network is provided through predictive phase balancing. The exemplary methods described herein facilitate production and distribution of electrical power using predictive phase balancing for demand response. In one exemplary embodiment, methods enable power providers to offer discounts to its customers for participating in the processes described herein.

One reason that power suppliers experience difficulty in forecasting demand for power may be because consumers clear lack incentive and knowledge to manage power use or to assist the power supplier in forecasting future needs. As a result, the power supplier lacks reliable information in balancing supply and demand, thereby introducing unpredictability into their planning processes. Moving to a system of customer participation in the demand forecasting process, the power supplier is better able predict and manage how much power will be consumed, as well as redistribute power according to identified needs.

Figure 1:
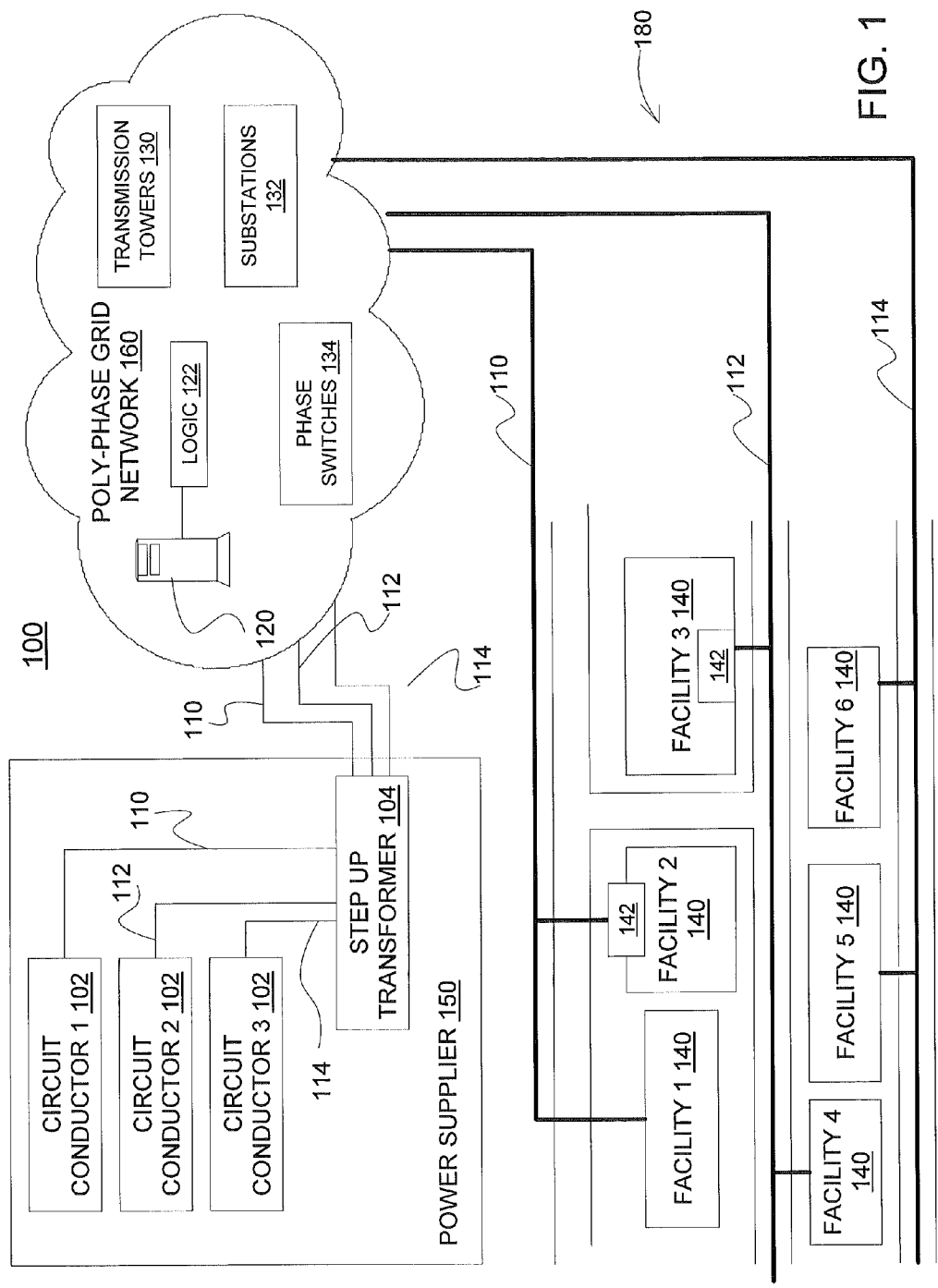
FIG. 1 depicts a block diagram of a system upon which predictive phase balancing may be implemented in an exemplary embodiment.

Turning now to FIG. 1, an exemplary system 100 for providing predictive phase balancing will now be described. The system 100 of FIG. 1 includes a power supplier 150 that forms part of a poly-phase grid network 160. As provided herein, a grid refers to an interconnected electrical network that provides electricity for consumers within a defined region. As shown in FIG. 1, the power supplier 150 includes three circuit conductors (1-3) 102 that produce power in a three-phase process. The circuit conductors 102 each carry alternating current of the same frequency, and each alternating current reaches its peak values at differing times. For example, using one current as a reference point, the other two currents are delayed in time by one-third and two-thirds, respectively, of a given cycle (i.e., three complementary currents with a phase separation of one-third cycle). This delay between the phases of current has the advantage of ensuring constant power transfer for each cycle of the current. The three phases of current are shown in FIGS. 1 as 110, 112, and 114.

The power supplier 150 includes a step-up transformer 104 that processes the currents 110, 112, and 114 before distribution through the grid network 160. For example, the step-up transformer 104 may perform a conversion to step up the voltage of the currents to one that is suitable for transmission over the network 160.

The poly-phase grid network 160 may include a number of transmission towers 130 and substations 132 typically found in a power grid network. These transmission towers 130 and substations 132 further process the currents 110, 112, and 114 according to prescribed needs. In addition, the poly-phase grid network 160 includes a number of phase switches 134, which may be implemented in hardware, software, or a combination thereof. The phase switches 134 are configured to redirect or re-allocate units of electrical power among end user facilities as instructed by the predictive phase balancing processes described herein.

In an exemplary embodiment, the poly-phase grid network 160 includes a host system computer 120 that executes logic 122 configured for implementing the predictive phase balancing processes. The host system computer 120 depicted in FIG. 1 may be implemented using one or more servers operating in response to one or more computer programs (e.g., the logic 122) stored in a storage medium accessible by the server. The host system computer 120 may operate as a network server (e.g., a web server) to communicate with network entities, such as the power supplier 150, transmission towers 130, substations 132, phase switches 134, and power consumers or customers, which are illustrated in FIG. 1 as facilities (1-6) 140. The host system computer 120 handles sending and receiving information to and from these network entities and can perform associated tasks.

The facilities 140 represent a geographic region 180 serviced by the power supplier 150. As shown in FIG. 1, and by way of non-limiting example, the currents 110, 112, and 114 provide power to the region 180 (e.g., current 110 services facilities 1 and 2, current 112 services facilities 3 and 4, and current 114 services facilities 5 and 6). The facilities 140 may represent any business establishment, such as an industrial or manufacturing plant, hospital, hotel, etc., or other establishment that consumes power. In an embodiment, the power needs of the facilities 140 are managed by the host system computer 120 via a service agreement and a unique account. The host system computer 120 may utilize the accounts of each of the facilities 140 to identify the facilities 140 for the purpose of providing the predictive phase balancing processes described further herein.

In an embodiment, at least some of the facilities 140 include smart meters 142 that are communicatively coupled to corresponding facilities 140 and provide power consumption information over the poly-phase grid network 160 to network entities, such as the host system computer 120 and the power supplier 150. The smart meters 142 may be implemented in hardware, software, or a combination thereof to monitor and measure power usage, and include a transmission means for communicating this information over the network 160.

In an embodiment, each of the facilities 140 communicates its estimated power needs to the host system computer 120. These estimations may be derived from information known only to the particular facility from which is originates. For example, if the facility 140 is a hotel, the estimated power demand may be calculated as a function of the occupancy rate of the hotel for the period of time in which the estimated power demands are calculated. In this example, if the hotel is experiencing a 10% decrease in its average occupancy for the week of January 22, the hotel may reduce the estimated demand by a correlative percentage. This information is received at the host system computer 120 and processed by the logic 122 as will be described further herein.

In an embodiment, the host system computer 120 may include internal memory for storing the account record information for its customers. Additionally, the anticipated power demands provided by the facilities 140 may be stored in the memory of the host system computer 120 and may be linked to the respective account records. The logic 122 may include an interface that guides the facilities 140 through the process of providing this information. While this information is described as being stored in the internal memory of the host system computer 120, it will be understood that the information may alternatively be stored in a separate storage device (not shown) that is communicatively coupled to the host system computer 120.

In an embodiment, the poly-phase grid network 160 further includes a communications network (e.g., wide area network (WAN), a local area network (LAN), a global network (e.g. Internet), a virtual private network (VPN), and an intranet for communicating data). The network 160 may be implemented using a wireless network or any kind of physical network implementation known in the art.

The configuration exemplified in FIG. 1 illustrates one example of a system that employs the predictive phase balancing processes described herein. It will be understood that variations to the system 100 of FIG. 1 may be made in order to realize the advantages of the exemplary embodiments.

In one exemplary embodiment, once an account is established for the facility 140, the host system computer 120 prompts the account holder to provide a projected resource demand (e.g., given in units, such as kilowatt hour) for a given time period via, e.g., the user interface component described above. Additionally, through the account and the user interface, the host system computer 120 may offer discounts in the costs of the power in return for providing these estimated power requirements.

The host system computer 120 acquires projected demand for other facilities 140 and calculates a collective demand forecast. The demand forecast is broken down by phase, as well as time intervals of the projected demand. FIG. 3 illustrates a demand forecast 300 with sample data. These, and other features, of the predictive phase balancing will now be described.

Figure 2:
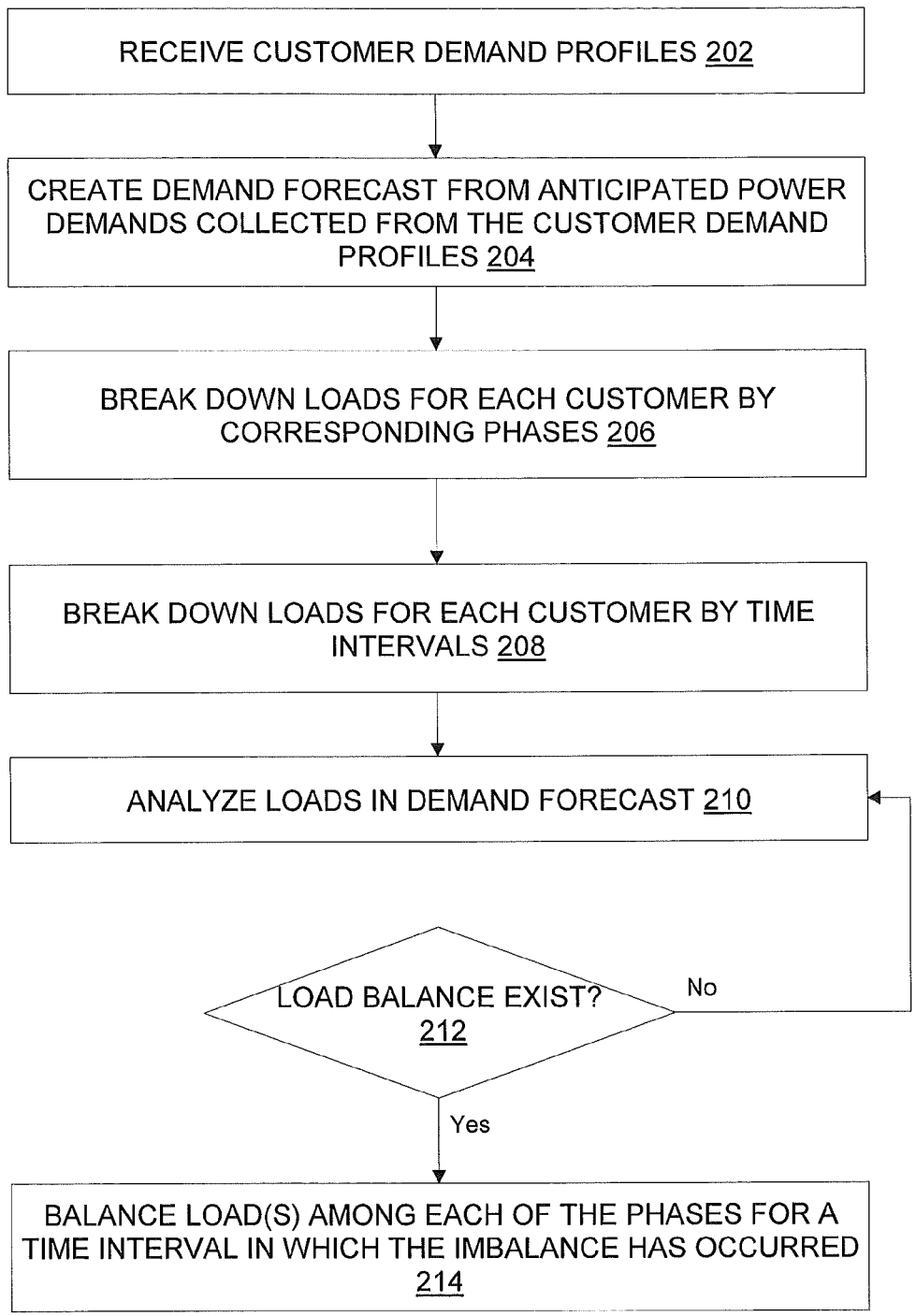
FIG. 2 illustrates a flow diagram describing a process for implementing predictive phase balancing in an exemplary embodiment.

Turning now to FIG. 2, an exemplary process for implementing the predictive phase balancing is described. At step 202, the logic 122 receives a customer demand profile from a facility 140. The customer demand profile includes anticipated power demands for a customer over a period of time. For example, the customer demand profile may be calculated for an upcoming week and may include estimated units of power (e.g., in kilowatt hours) for each time interval of the week. The time intervals may be configured in any time denomination, such as hourly or daily.

The host system computer 120 logic 122 creates a demand forecast from the customer demand profiles of each of the facilities 140 at step 204. The logic 122 breaks down the loads for each customer by corresponding phases at step 206. For example, as shown in FIG. 3, three phases 310, 312, and 314 correspond with currents 110, 112, and 114, respectively. Each entry (e.g., 304) in a phase (e.g., phase 310) reflects the anticipated load (i.e., a quantified value of the load, such as 400 kilowatts) for a single facility 140. In addition, as shown in FIG. 3, the logic 122 breaks down the loads for each customer according to a time interval associated with the projected demand at step 208. As shown in FIG. 3, the loads for each facility in a given phase (e.g., 310) and for a given time interval (e.g., 4-5) are summed up and a total summation value (e.g., 306) represents the total load for the facilities 140 associated with that phase.

At step 210, the logic 122 analyzes the loads in the demand forecast 300. The logic 122 calculates the differences among each of the total summation values for phases 310, 312, and 314 at each time interval. Thus, for the time interval identified as 12-1 in FIG. 3, the logic 122 calculates the difference between the total summation values 306 in phases 1 and 2 (=100). The logic 122 calculates the difference between the total summation values in phases 2 and 3 (=200). The logic 122 also calculates the difference between the total summation values in phases 1 and 3 (=100). The maximum difference among the three calculations is 200, as reflected in the row 315 under the column relating to the time interval 12-1 of FIG. 3. Also, the analysis performed by the logic 122 may include determining increases in the anticipated loads across time intervals. As shown in FIG. 3, for example, increases in loads across time intervals for a given facility are shown in bold font. An increasing difference in loads across time intervals An increasing difference in loads across time intervals for a given phase suggests to an administrator of the power supply system that the loads are becoming more imbalanced over time, which increases the chance the system will become unstable. By identifying these increases in the differences, the power supplier may become more proactive in performing phase balancing.

In an embodiment, a load is considered to be balanced when the load values are substantially equal; however, slight fluctuations in loads may be acceptable. The logic 122 may be configured to utilize a pre-defined maximum deviation or difference among the total summation values for the phases at a given time interval to determine whether a load imbalance exists. In this manner, the logic 122 calculates the differences in the total summation values for the phases at each time interval and enters the highest value in the corresponding block in row 315. Suppose the maximum allowable difference is set at 300. If any entries in the row 315 reach or exceed this limit, the loads are considered imbalanced for the affected time interval, and the logic 122 is configured to implement actions to address the imbalance.

At step 212, the logic 122 determines whether an imbalance exists for a given time interval. If not, the process returns to step 210 and the logic 122 continues to analyze the loads.

Otherwise, at step 214, if the logic 122 determines an imbalance has occurred for a given time interval, the logic 122 is configured to take actions directed to balancing the loads within each of the phases for a given time interval. In an exemplary embodiment, the logic 122 may be configured to balance the loads using a greedy algorithm. For example, the logic 112 incrementally removes the smallest load from the phase identified as having the highest total summation value and re-allocates the smallest load to the phase having the lowest total summation value. The logic 122 then determines if the loads are now balanced using the same technique identified above. If the loads are still unbalanced, the logic 122 continues by removing the next smallest load from phase identified as having the highest total summation value and re-allocates the next smallest load to the phase having the lowest total summation value. For example, using the data from the time interval 3-4 in FIG. 3, the maximum difference among the loads is 1,000 units which exceed the 300 threshold. The logic 122 removes the smallest load (e.g., 300) from phase 310 and re-allocates it to phase 314, which has the lowest total summation value of 1,300. In an exemplary embodiment, this re-allocation may be implemented by the logic 122 as an instruction to a corresponding phase switch 134 associated with the facilities 140 subject to the load transfer.

Once this re-allocation has been completed, the logic 122 evaluates the loads again to determine whether they are in balance. Using the same example above, after re-allocation, the total summation value of phase 310 is now 2,000, the total summation value of phase 312 is 1,400, and the total summation value of phase 314 is now 1,600. The maximum difference among the phases is now 600 (2,000 minus 1,400). As the maximum difference still exceeds the threshold of 300, the logic 122 removes the next smallest load (e.g., 400) from phase 310 (which has the highest total summation value of 2,000) and re-allocates the load to phase 312, which has the smallest total summation value of 1,400. After re-allocation, the total summation value of phase 310 is 1,600, the total summation value of phase 312 is 1,800, and the total summation value of phase 314 is 1,600, which yields a maximum difference of 200. This difference falls below the set threshold, so the logic 122 determines that the loads are now balanced.

In addition to utilizing the customer demand profiles as criteria for re-balancing loads, the logic 122 may also be configured to utilize current power consumption data in determining load imbalances. For example, in one embodiment, the logic 122 may receive actual meter data from smart meters 142 reflecting actual usage. The customer demand profiles, which are provided in advance of the time intervals to be evaluated, may at times underestimate the customer's actual needs. Thus, the logic 122 may evaluate the demand forecast 300 of FIG. 3, in conjunction with actual meter usage, in determining whether an imbalance has occurred. Thus, if at 3:00, the customer load reflecting 1,600 units in phase 310 sends meter information that actual usage is substantially lower, the logic 122 may be configured to delay any re-allocation of the customer's load, or may consider an alternative load in the phase to re-allocate.

Technical effects include management of electrical power generation and distribution in a poly-phase power grid network provided through predictive phase balancing. The predictive phase balancing facilitates production and distribution of electrical power using customer demand forecast information specific to the customer, breaks down the information by phase and time interval, determines any imbalances in loads associated with the phases and time intervals, and rebalances loads among the phases for an affected time interval.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims that follow. These claims should be construed to maintain the proper protection for the invention first described.

What is claimed is:

1. A method for implementing predictive phase balancing, comprising:
    transmitting, by a computer processor of a power provider, a request for a projected power demand to each customer of a plurality of customers serviced by a poly-phase grid network;
    receiving corresponding projected power demands from at least a portion of the plurality of customers and storing the projected power demands as customer demand profiles;
    creating, by the computer processor, a demand forecast at least in part from the projected power demands collected from the customer demand profiles, the creating comprising breaking down loads for each customer by corresponding phases in the poly-phase power grid network, the loads corresponding to the projected power demands; and
    balancing the loads among each of the phases based on any load imbalances determined from the demand forecast; and
    re-balancing the loads among each of the phases based on load imbalances determined from data collected from a smart meter in conjunction with the projected power demands received from the plurality of customers.

2. The method of claim 1, wherein the creating further includes breaking down the loads for each customer into time intervals, wherein balancing the loads among each of the phases includes balancing the loads among the phases within one of the time intervals.

3. The method of claim 2, further comprising:
    determining the load imbalances in the demand forecast, comprising:
    summing a quantified value of the loads in each of the phases and for each of the time intervals resulting in a total summation value for each of the phases and for each of the time intervals;
    storing the loads and corresponding total summation values for each of the phases and at each of the time intervals; and
    for each of the time intervals:
    determining a difference between the summation value of a first phase of the phases and a second phase of the phases, a difference between the second phase of the phases and a third phase of the phases, and a difference between the first phase and the third phase; and
    upon determining that the difference between any of the summation values exceeds a threshold value, incrementally removing smallest loads from the phase having the highest summation value and iteratively re-allocating the smallest loads to other phases until the loads in all of the phases are balanced, the loads determined to be balanced when each of the summation values is substantially equal to one another.

4. The method of claim 2, wherein the time intervals are represented in hours.

5. The method of claim 2, wherein the time intervals are represented in days.

6. The method of claim 1, wherein balancing the loads among each of the phases is implemented by a phase switch in the poly-phase grid network.

7. The method of claim 1, wherein the projected power demands for at least one of the customer demand profiles are calculated as a function of an occupancy rate for a facility of the corresponding customer.

8. The method of claim 1, wherein transmitting the request for a projected power demand includes transmitting the request for the projected power demand in units of power for a given time period; and
    wherein the computer receives the projected power demand in the requested units of power from the customer.

9. The method of claim 1, further comprising:
    providing a discount in an energy bill for the customer in return for participation in providing the computer with the projected power demand.

10. A computer program product for implementing predictive phase balancing, the computer program product comprising a non-transitory storage medium having computer instructions embodied thereon, which when executed by a computer of a power provider, causes the computer to implement a method, the method comprising:
    transmitting a request for a projected power demand to each customer of a plurality of customers serviced by a poly-phase grid network;
    receiving corresponding projected power demands from at least a portion of the plurality of customers and storing the projected power demands as customer demand profiles;
    creating a demand forecast at least in part from the projected power demands collected from the customer demand profiles, the creating comprising breaking down loads for each customer by corresponding phases in the poly-phase power grid network, the loads corresponding to the projected power demands; and
    balancing the loads among each of the phases based on any load imbalances determined from the demand forecast; and re-balancing the loads among each of the phases based on load imbalances determined from data collected from a smart meter in conjunction with the projected power demands received from the plurality of customers.

11. The computer program product of claim 10, wherein the creating further includes breaking down the loads for each customer into time intervals, wherein balancing the loads among each of the phases includes balancing the loads among the phases within one of the time intervals.

12. The computer program product of claim 11, wherein the method further comprises:
determining the load imbalances in the demand forecast, comprising:
summing a quantified value of the loads in each of the phases and for each of the time intervals resulting in a total summation value for each of the phases and for each of the time intervals;
storing the loads and corresponding total summation values for each of the phases and at each of the time intervals; and
for each of the time intervals:
determining a difference between the summation value of a first phase of the phases and a second phase of the phases, a difference between the second phase of the phases and a third phase of the phases, and a difference between the first phase and the third phase; and
upon determining that the difference between any of the summation values exceeds a threshold value, incrementally removing smallest loads from the phase having the highest summation value and iteratively re-allocating the smallest loads to other phases until the loads in all of the phases are balanced, the loads determined to be balanced when each of the summation values is substantially equal to one another.

13. The computer program product of claim 11, wherein the time intervals are represented in hours.

14. The computer program product of claim 11, wherein the time intervals are represented in days.

15. The computer program product of claim 10, wherein balancing the loads among each of the phases is implemented by a phase switch in the poly-phase grid network.

16. The computer program product of claim 10, wherein the projected power demands for at least one of the customer demand profiles are calculated as a function of an occupancy rate for a facility of the corresponding customer.

* * * * *